April 29, 1930.　　　　　I. HUPP　　　　　1,756,063

CLUTCH MECHANISM

Filed Nov. 5, 1926　　　　4 Sheets-Sheet 1

April 29, 1930.　　　　　I. HUPP　　　　　1,756,063
CLUTCH MECHANISM
Filed Nov. 5, 1926　　　　4 Sheets-Sheet 2

Inventor:
Irvin Hupp
By
Rector, Hibben, Davis & Macauley Attys

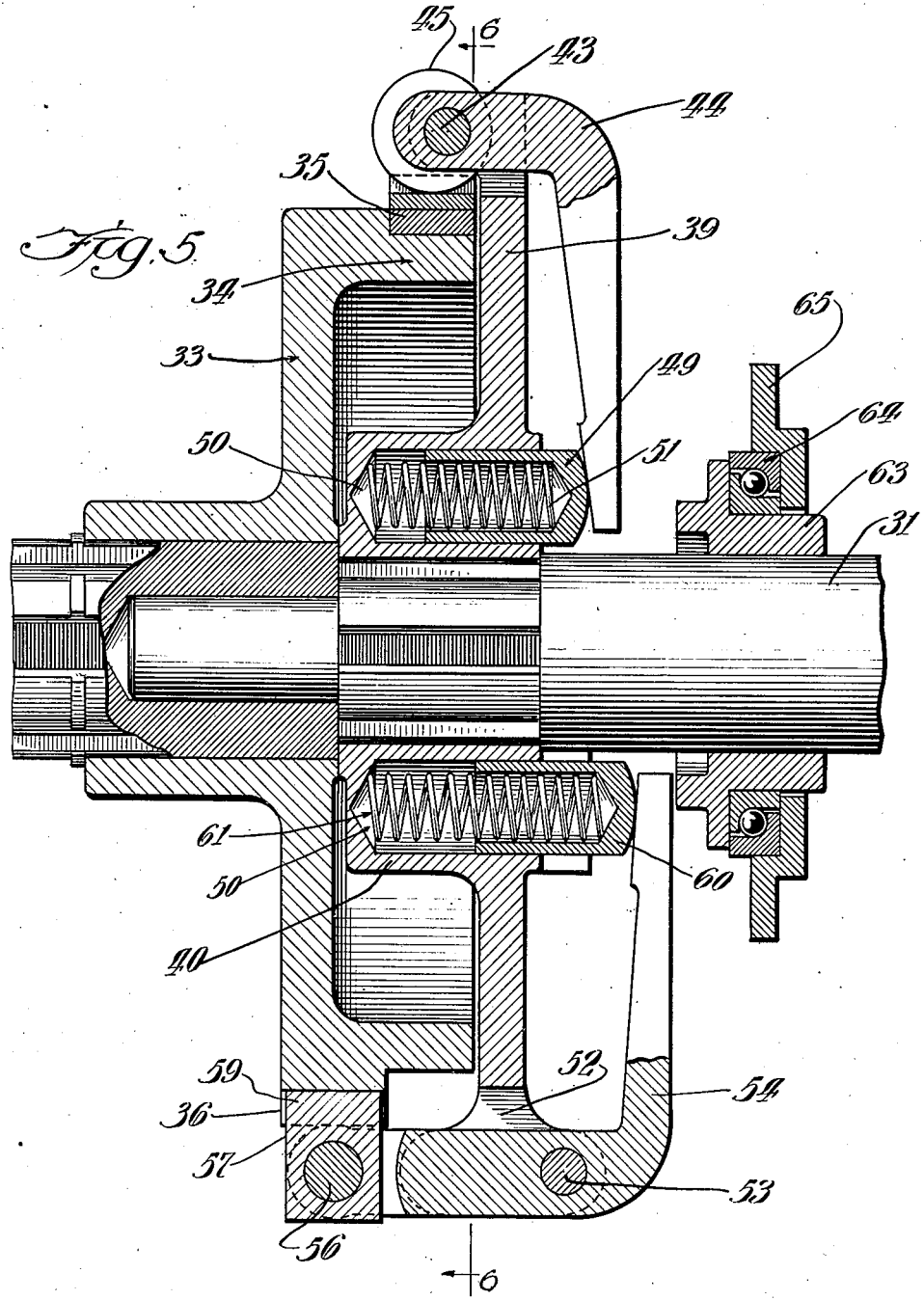

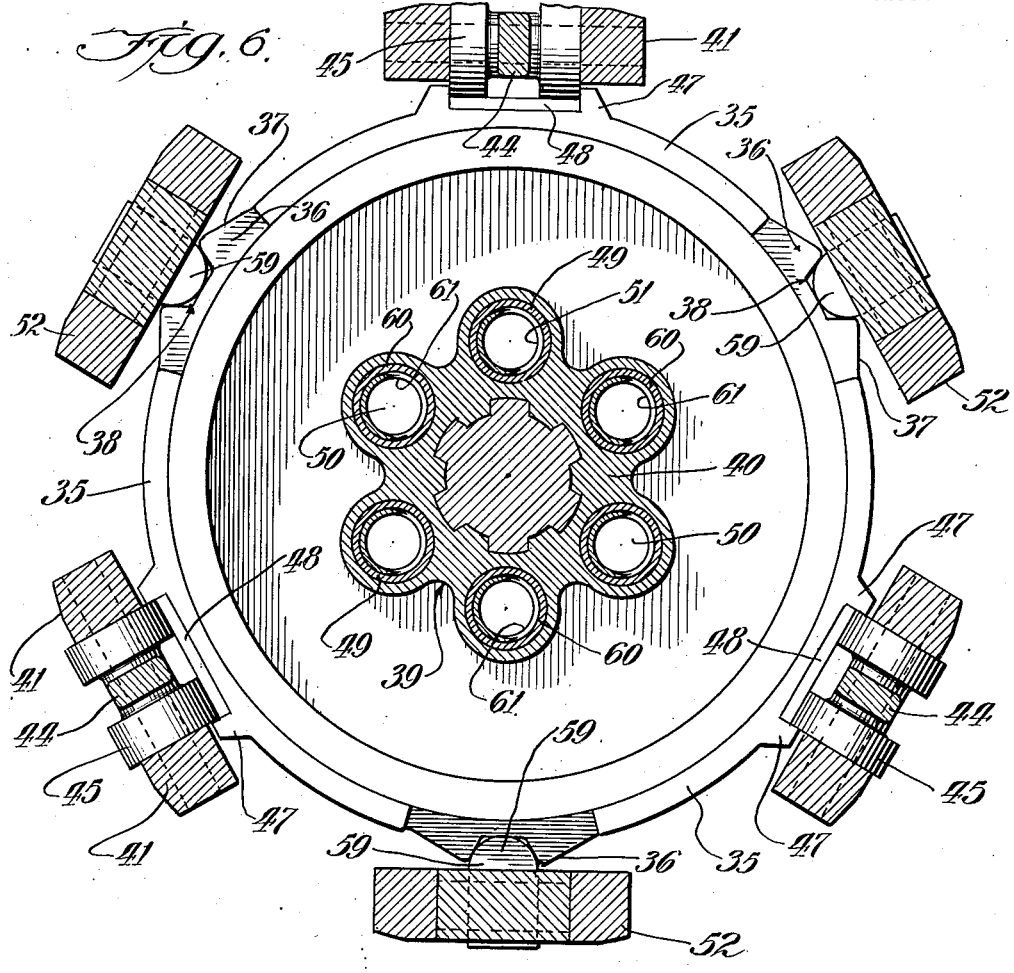

Patented Apr. 29, 1930

1,756,063

UNITED STATES PATENT OFFICE

IRVIN HUPP, OF CHICAGO, ILLINOIS

CLUTCH MECHANISM

Application filed November 5, 1926. Serial No. 146,340.

My invention relates to clutches and more particularly to clutches adapted for use in connection with transmission or change speed mechanism for automotive vehicles, and more especially between the transmission and the propeller shaft of the vehicle.

The principal object of my invention is to provide a novel combination of clutches which are simple in contruction, powerful in action, quiet and efficacious in operation and yet capable of being disconnected with little effort on the part of the operator.

With the above and incidental objects in view, the invention consists in certain novel features of construction and combination of parts, the essential elements whereof are recited in the appended claims, and a preferred form of embodiment of which is described in detail hereinafter, and illustrated in full in the accompanying drawings which form part of this application.

Figure 1:
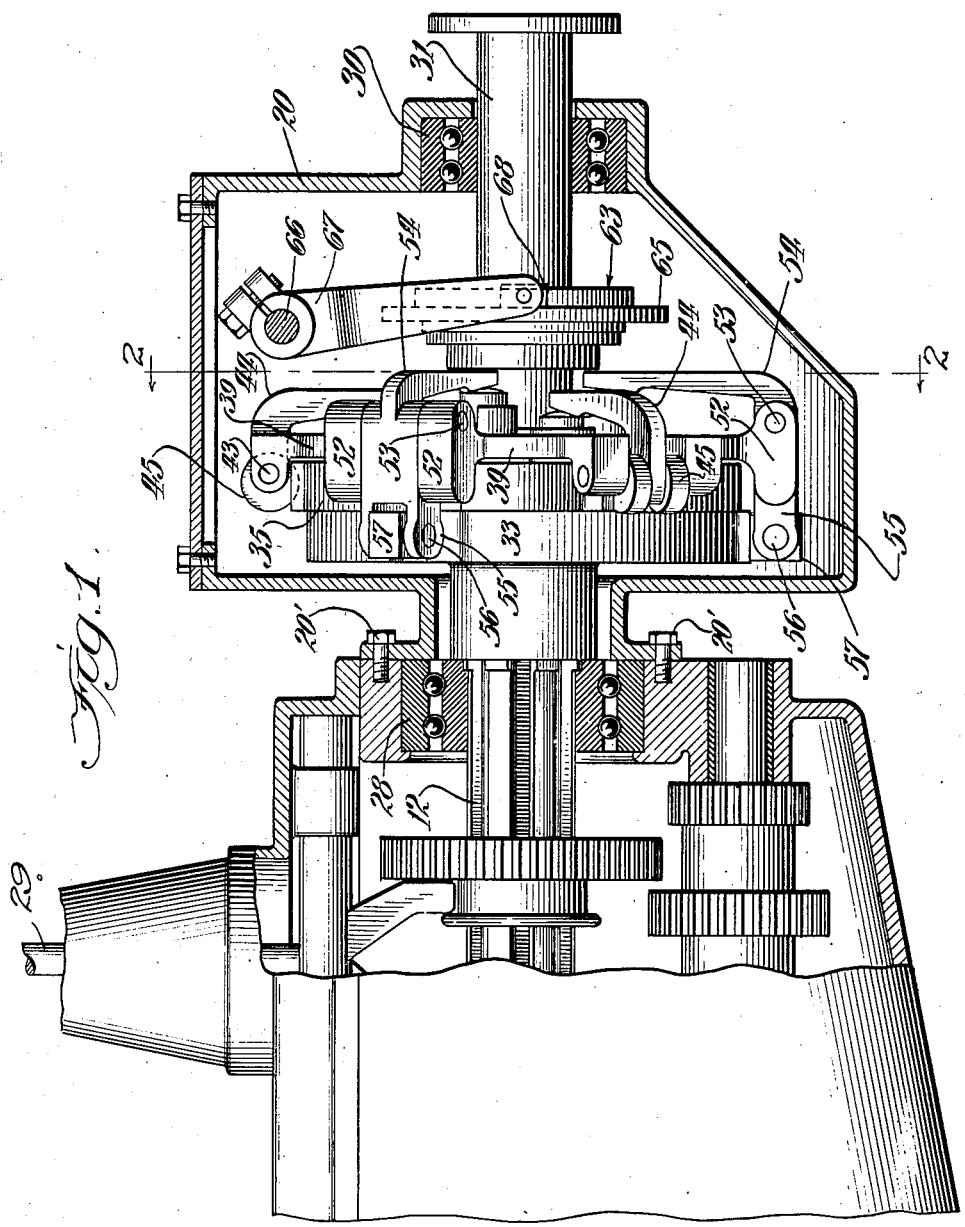
Figure 2:
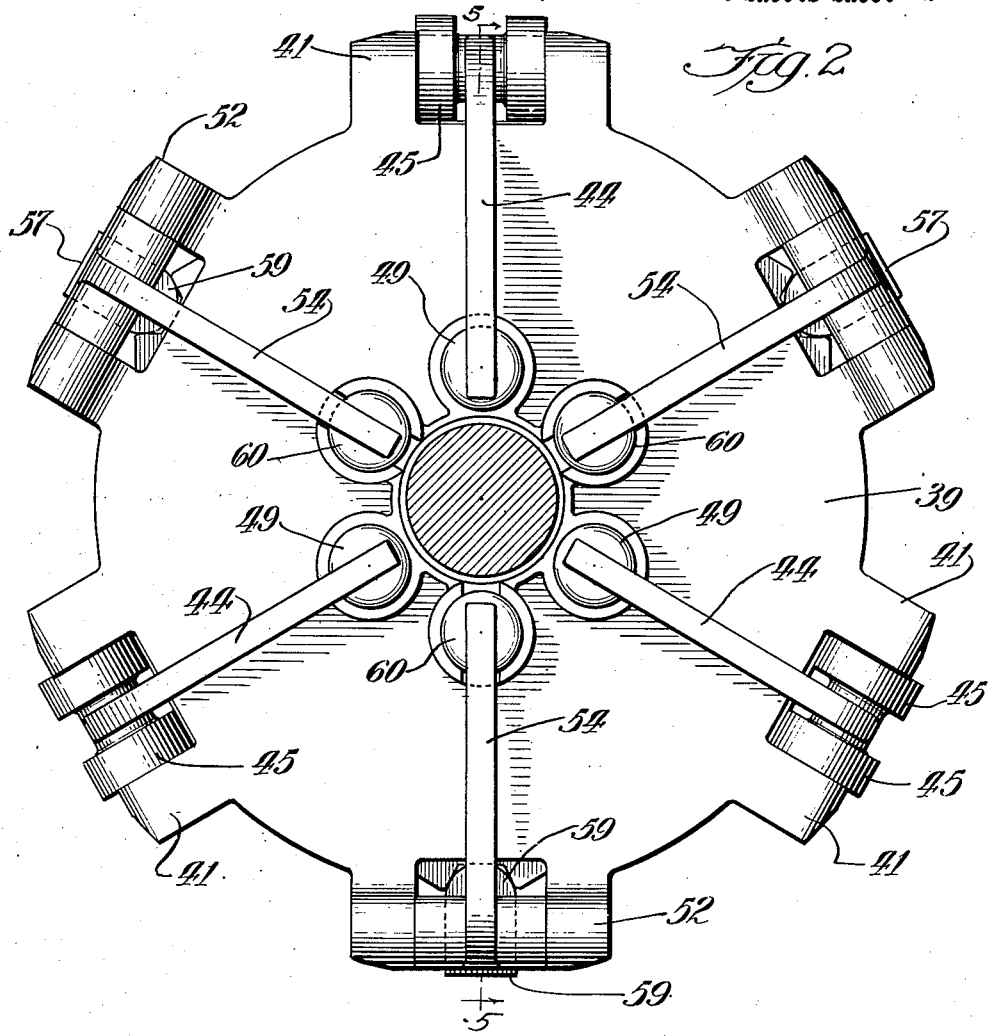
Figure 3:
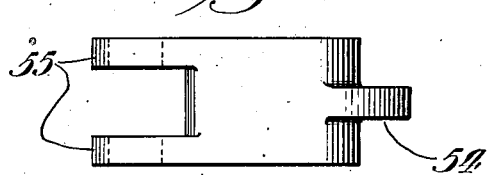
Figure 4:
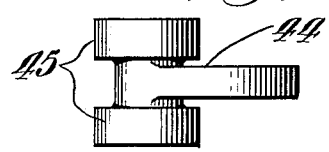

Fig. 1 is a side elevation of the transmission and clutch mechanism embodying part of my invention, the housing for the clutch mechanism and part of the housing for the transmission being shown in section to expose the parts more clearly to view; Fig. 2 is a rear elevation of the clutch mechanism shown in Fig. 1, the view being taken as on the section line 2—2 of Fig. 1; Fig. 3 is a plan view of one of the operating levers for the supplemental rear clutch and Fig. 4 is a plan view of one of the operating levers for the main rear friction clutch; Fig. 5 is a longitudinal section taken through the combination supplemental and main friction clutches, as on the line 5—5 of Fig. 2; Fig. 6 is a transverse section taken through the same as on the line 6—6 of Fig. 5, and Fig. 7 is a side elevation of one of the friction shoes of the main friction clutch.

The rear end of the transmission shaft, as shown in Fig. 1, is journaled in the bearing 28. The transmission mechanism is preferably, though not necessarily, of sliding gear type and includes the main transmission shaft 12, a counter shaft and the usual gears, some of which are shifted by means of the usual "wabble stick" lever 29 (shown partly broken away) to effect changes in speed, as is well understood in the art. Secured by means of screws 20' or otherwise to the rear end of the transmission case is the housing 20 having a bearing 30 in which a shaft section 31 is journaled near its rear end. One part of a universal joint (not shown) is connected to the rear end of the shaft section 31 while the other part is connected to the forward end of the propeller shaft. The forward reduced end of the shaft section 31 is journaled in the hollow rear end of the transmission shaft as shown in Fig. 5.

Keyed to the rear end of the transmission shaft 12 is a drum-shaped member 33 having a rearwardly extending circumferential flange 34. The outer peripheral portion of the flange 34 is slightly reduced in diameter to accommmodate three friction shoes 35, the construction of which is best illustrated in Figs. 6 and 7. The periphery of the member 33 is also provided with three pairs of integral projections 36, the projections of each pair being oppositely inclined as at 37 and providing a notch or recess 38 between them.

Keyed to the forward end of the shaft section 31 is a disk 39 (Figs. 1, 2, 5 and 6) having an enlarged hub 40. The periphery of the disk 39 is provided with three pairs of integral lugs or ears 41 which project outwardly and forwardly, the pairs of lugs being equally spaced about the disk. Fast at its ends in each pair of lugs is a pin 43 on which is pivoted an L-shaped lever 44 (Figs. 1, 2, 4 and 5) provided with integral cams 45 which are in the form of disks eccentric with respect to the pin 43. As shown in Figs. 6 and 7, each friction shoe 35 is provided with a pair of projections 47 between which is seated a hardened steel plate 48 and the cams 45, which are also formed of hardened steel, are positioned between the projections 47 and bear on the respective plates 48. The plates 48 are employed to reduce the wear as the friction shoes 35 are preferably formed of bronze. The inner ends of the levers 44 contact with the rear curved ends of hollow plungers 49 which are slidable in deep holes 50 formed in the enlarged hub 40, and springs 51 are compressed between the forward ends of the recesses 50 and the ends of the bores in the plungers 49 and maintain the plungers in contact with their respective levers 44.

The disk 39 is also provided with three pairs of projections 52 (Figs. 1, 2 and 5) and these projections extend both forwardly and rearwardly with respect to the plane of the disk 39. Secured in the rearwardly extending portions of each pair of projections 52 is a pin 53 on which is journaled a lever 54, there being one lever for each pair of projections 52. The enlarged portions of the levers 54 (Figs. 1, 2 and 3) fit snugly between the projections 52 so that any substantial lateral play of the levers 54 is prevented. The forward end of each lever 54 is recessed to provide two ears 55 in which is mounted a pin 56 carrying a block 57 having an inwardly extending curved projection 59, as best shown in Figs. 2 and 6. The inwardly extending arms of the levers 54 bear against the outer ends of plungers 60, which are like the plungers 49 and are held in engagement with the levers by the contained springs 61, which are similar to the springs 51.

Freely mounted on the shaft section 31 is a collar 63 (Figs. 1 and 5) supporting a ball bearing 64 which carries a disk 65. Fast on a shaft 66 (Fig. 1), journaled in the casing 20, is an operating fork 67, the arms of which carry blocks 68 engaging the rear side of the disk 65.

The operation of the foregoing described construction is as follows: Upon depression of the usual foot pedal, the engine clutch is first disconnected through any suitable connections. Then upon further depression, the foot lever, through suitable connections, rocks the shaft 66 and fork 67 so that the blocks 68 move the collar 63 forwardly whereupon the collar 63 contacts with and rocks the levers 54 to raise the projections 59 of the supplemental clutch out of engagement with the drum member 33. Then upon still further depression of the foot pedal the collar 63 is slid forwardly to a further extent, and during this additional movement the forward edge of the collar 63 contacts with the inner ends of the levers 44, thus rotating the eccentric cams 45 to relieve the pressure of the cams on the friction shoes 35. Thus the engine clutch, then the supplemental rear clutch, and finally the main friction rear clutch are disconnected or rendered ineffective when the gears are to be shifted. After the change in speed has been effected, and upon release of the foot pedal, the foot pedal is restored to normal position through the usual spring and during its initial return movement the collar 63 slides out of contact with the inner ends of the levers 44, whereupon the springs 51 rock the levers 44 and the eccentrics 45 firmly press the bronze friction shoes 35 against the periphery of the drum member 33, which results in the friction shoes picking up the transmission so as to synchronize the speed of the main transmission shaft and the propeller shaft. Upon continued return movement of the foot pedal the collar 63 moves out of contact with the inner ends of the levers 54, whereupon the springs 61 rock the levers and move the projections 59 into contact with the periphery of the member 33. Finally, the engine clutch is re-engaged. When the collar 63 moves out of contact with the levers 44 the friction exerted by the friction shoes 35 on the member 33 is sufficient to permit the propeller shaft to be driven through this main friction clutch under normal load and running conditions. However, if the load is particularly heavy the friction shoes 35 will slip on the member 33 and the projections 59 will come into contact with the cam edges 37 of one of each pair of the projections 36. The drive of the propeller shaft through the transmission may then be through the main friction clutch and the engagement of the projections 59 with the cam edges 37 of the supplemental clutch. Should the load be even more abnormally heavy, the projections 59 may ride over the cam edges 37 and then drop into the recesses 38, thus substantially positively driving the propeller shaft from the transmission.

It will be understood that I prefer to run my combination clutch, located in the casing 20, in oil or grease, in order to make the operation more silent and efficacious. It will also be understood that when the transmission is disconnected from the propeller shaft the centrifugal force is sufficient to throw the friction shoes 35 slightly outwardly to relieve the friction of the shoes on the member 33. Due to the leverages obtained through the levers 44 and 54, it will be obvious that both the supplemental and main friction clutches have tremendous capacity or power while the effort necessary to operate them is comparatively slight, and in fact no greater than that ordinarily necessary to operate only the engine clutch of an automobile.

I claim—

1. In a clutch, the combination of two shafts, a circular member rotatable with one shaft, an element rotatable with the other shaft, levers pivoted on said element, friction shoes adapted to engage the periphery of said member, spring means for causing one end of said levers to press against said shoes, other levers pivoted on said element, spring means for pressing one end of said other levers against the periphery of said member, and means on said periphery with which said last mentioned levers coact.

2. In a clutch, the combination of two shafts, a circular member on one shaft having a frictional surface and projections, an element on the other shaft, levers pivoted on said element, shoes coacting with said frictional surface, spring means for operating said levers to press said shoes against said frictional surface with sufficient effect to connect said shafts together under normal loads and running conditions, other levers pivoted on said element, means on said last mentioned levers adapted to engage said projections when said shoes slip on said frictional surface under unusual loads and running conditions.

3. In a clutch, the combination of two shafts, a circular member on one shaft having a frictional surface and projections, the projections having inclined sides and providing recesses between them, an element on the other shaft, levers pivoted on said element, shoes coacting with said frictional surface, spring means for operating said levers to press said shoes against said frictional surface with sufficient effect to connect said shafts together under normal loads and running conditions, other levers pivoted on said element, means on said last mentioned levers adapted to engage the inclined sides of said projections when said shoes slip on said frictional surface under unusual loads and running conditions and adapted to engage in said recesses under increased abnormal loads and running conditions.

4. In a clutch, a driving shaft and a driven shaft, a drum having an external friction surface carried by one of said shafts and rotatable therewith, a plurality of friction devices coacting with said friction surface to effect connection of said shafts, an element carried by said other shaft, operating levers for said friction devices pivoted to said element, cam devices carried at one end of said levers and engageable with the respective friction devices, separate yieldable means engageable with the other ends of each of said levers and normally moving and holding said levers so that said cam devices cause said friction devices to frictionally engage said friction surface, and means for moving said levers simultaneously in opposition to said yieldable means to remove the pressure of said cams from said friction devices to disconnect said shafts.

5. In a clutch, the combination of a driving shaft and a driven shaft, a clutch member having a circumferential friction surface carried by one of said shafts, a plurality of friction shoes, an element carried by said other shaft, levers pivotally carried by said element and corresponding in number to said shoes, an eccentric cam carried at one end of each lever, each said cam being engageable with its respective shoe, separate spring means engaging the opposite end of each lever and tending to move the lever in one direction to cause said cam to press against said shoe to frictionally engage the shoe with said friction surface, and a member movable toward said levers to simultaneously engage and move the same in opposition to said spring means to effect uncoupling of said shafts and movable in the opposite direction to permit coupling of said shafts.

6. In a clutch, the combination of a driving shaft and a driven shaft, a circular clutch member having a plurality of external clutch surfaces, a plurality of friction devices frictionally coacting with one of said surfaces, an element carried by said other shaft, means carried by said element for moving and yieldably holding said friction devices in contact with said surface, other clutch devices carried by said element and positively engageable with other of said clutch member surfaces, means carried by said element for moving and holding said positively engageable clutch devices in engagement with said other of said surfaces, and a common control means for operating each said means to disconnect said positive and friction clutch devices in the sequence named to disconnect said shafts.

7. In a clutch, the combination of a driving shaft and a driven shaft, a circular clutch member having a plurality of clutch surfaces, a plurality of friction devices coacting with one of said surfaces, each said device having a driving socket, an element carried by said other shaft, levers pivoted to said element and having cams engageable in the sockets of said friction devices to engage the devices with said friction surface and frictionally connect said shafts, spring means acting on said levers to hold said cams and devices normally engaged, other clutch devices carried by said element and engageable in recesses in another surface of said clutch member to positively engage said member and element to positively connect said shafts, spring means carried by said element for moving and holding said positively engageable clutch devices engaged, and a common control means for operating each said levers and spring means to disconnect said positive and friction clutch devices.

8. In a clutch, the combination of a driving and driven shaft, a clutch member having two clutch surfaces and carried by one of said shafts, one of said surfaces having a plurality of recessed projections with sides inclined towards the recess and the other surface having a plurality of friction devices mounted thereon and frictionally engageable therewith to frictionally connect said shafts, an element carried by said other shaft, means carried by said element for normally moving and holding said friction devices in frictional engagement with said clutch member, other clutch devices carried by said element and engageable with said other clutch surface and said recesses therein, said latter friction devices being adapted to normally engage the surface between said projections and to engage the inclined sides of said projections upon movement of said first named friction devices on said surface and to finally engage said recesses upon continued movement of said devices upon said surface to positively connect said shafts.

9. In a clutch, the combination of a driving shaft and a driven shaft, a drum member on one of said shafts having a plurality of recesses in its outer surface, friction shoes engageable with said drum to frictionally connect said shafts, an element carried by said other shaft, means carried by said element for engaging said friction shoes with said drum, clutch devices carried by said element and normally engaging said other drum surface and engageable in said recesses upon movement of said shoes upon said drum to positively connect said shafts, means carried by said element for engaging and holding said clutching devices engaged with said drum and in said recesses, and a common control for operating all said engaging means to disengage such clutch devices and shoes in the sequence named.

10. In a clutch, the combination of a driving shaft and a driven shaft, a clutch member having a plurality of clutching surfaces carried by one of said shafts, an element carried by said other shaft, friction shoes associated with one of its clutching surfaces, positive clutching devices for positively engaging another of said clutching surfaces of said clutch member, said positive clutch devices being carried by operating members hinged to said element, other operating members hinged to said element and engageable with said shoes, yieldable means normally effective upon said operating members to hold said shoes and positive clutch devices in clutching engagement with their respective clutching surfaces, and a common means for operating said operating members to first disengage said positive clutching devices and then said shoes to disconnect said shafts.

11. In a clutch, the combination of a driving shaft and a driven shaft, a clutch drum carried by one shaft and having an external clutching surface, friction devices engageable with said clutching surface, an element carried by the other shaft, means for frictionally engaging said drum and said friction devices comprising operating members pivotally carried by said element, cams carried by said operating members at one end thereof and engageable with said friction devices, yieldable means separately engaging the other end of each of said operating members to normally move the same and said cams to hold said friction devices in engagement with said drum, and control means movable in opposition to said yieldable means for moving said operating members and cams away from said friction devices to disconnect said shafts.

12. In a clutch, the combination of a driving shaft and a driven shaft, a clutch drum carried by one shaft and having an external clutching surface, friction devices engageable with said clutching surface, an element carried by the other shaft, means for frictionally engaging said drum and said friction devices comprising operating members pivotally carried by said element, cams carried by said operating members at one end thereof and engageable with said friction devices, yieldable means engaging the other end of said operating members to normally move the same and cams to hold said friction devices in engagement with said drum, control means movable in opposition to said yieldable means for moving said operating members, and cams away from said friction devices to disconnect said shafts, and supplemental positive friction devices carried by said element and engageable with said drum secondarily to said friction devices to positively connect said shafts upon relative movement between said friction devices and said drum.

13. In a clutch, the combination of two shafts, a clutch member on one shaft, an element on the other shaft, friction shoes adapted to engage the periphery of said member, levers, one for each said shoe, pivoted to said element and having one end engaged with the respective friction shoes, and the other end engaged with operating means, said operating means including a plunger device for each said lever carried by said element and engaging said other ends of said levers, and springs interposed between said plungers and element for normally moving said plungers and levers in a direction to cause said shoes to engage said clutch member, said shoes being disengaged from said clutch member by movement of said plungers and levers in the opposite direction.

14. In a clutch, the combination of two shafts, a clutch member on one shaft, an element on the other shaft, clutching devices adapted to engage the periphery of said member, levers, one for each said clutching device, pivoted to said element and operatively connected to the respective clutching devices, and means for actuating said levers to operatively engage said clutching devices with said clutch member and for normally holding the same engaged including a plurality of plunger devices, one for each said lever, disposed in pockets in said element and operatively engaging one end of said levers, and springs disposed in said pockets coacting with said plunger devices.

In testimony whereof, I have subscribed my name.

IRVIN HUPP.